US008266642B2

(12) United States Patent
Torkaman et al.

(10) Patent No.: US 8,266,642 B2
(45) Date of Patent: Sep. 11, 2012

(54) OPTICAL DISK MECHANISM WITH SHAPED ROLLER AND DOUBLE BEAM MOUNT

(75) Inventors: Amir H. Torkaman, Sunnyvale, CA (US); Michael Szelong, Cupertino, CA (US); Kyquang Son, Dublin, CA (US); Ravender Goyal, Saratoga, CA (US); Paul R. Swan, Alameda, CA (US); Michael Umansky, San Francisco, CA (US)

(73) Assignee: Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 12/683,334

(22) Filed: Jan. 6, 2010

(65) Prior Publication Data
US 2011/0258645 A1 Oct. 20, 2011

Related U.S. Application Data (60) Provisional application No. 61/142,833, filed on Jan. 6, 2009.

(51) Int. Cl.
*G11B 17/05* (2006.01)

(52) U.S. Cl. ........................................ 720/625; 720/622

(58) Field of Classification Search ............... 360/265.1, 360/254.9, 255.8, 254.7, 255.6; 720/624, 720/625, 622, 619
See application file for complete search history.

(56) References Cited

U.S. PATENT DOCUMENTS

| | | | | |
|---|---|---|---|---|
| 3,664,246 A * | 5/1972 | Kuramoto et al. | ............ | 396/214 |
| 4,081,847 A * | 3/1978 | Shimada et al. | ............ | 360/271.5 |
| 5,719,844 A * | 2/1998 | Abe | ............................. | 720/625 |
| 6,282,066 B1 * | 8/2001 | Bonin | ........................ | 360/294.1 |
| 6,373,795 B2 * | 4/2002 | Takemasa et al. | ......... | 369/30.85 |
| 6,603,715 B1 * | 8/2003 | Klein | ......................... | 369/30.86 |
| 6,603,727 B1 * | 8/2003 | Ohtsuka | ....................... | 720/684 |
| 7,457,205 B2 * | 11/2008 | Klein | ......................... | 369/30.85 |
| 7,665,099 B2 * | 2/2010 | Peng et al. | .................... | 720/625 |
| 8,028,308 B2 * | 9/2011 | Chen | ............................ | 720/625 |
| 8,056,095 B2 * | 11/2011 | Chen | ............................ | 720/624 |
| 2005/0138651 A1 * | 6/2005 | Liao et al. | ..................... | 720/619 |
| 2005/0289570 A1 * | 12/2005 | Jernstrom et al. | ............ | 720/624 |
| 2006/0059499 A1 * | 3/2006 | Huang | .......................... | 720/624 |
| 2011/0214135 A1 * | 9/2011 | Furusho et al. | ............... | 720/624 |

* cited by examiner

*Primary Examiner* — Julie Anne Watko
(74) *Attorney, Agent, or Firm* — Antonelli, Terry, Stout & Kraus, LLP.

(57) ABSTRACT

An optical disk mechanism has a housing with at least one disk entry/exit aperture. A disk guide, such as a plate, is aligned with and guides an optical disk through the disk entry/exit aperture. Two beams rotatably support at least one roller and a drive mechanism. Flexing and biasing the roller towards the disk, the two beams maintain a rotational axis of the roller parallel to the disk and accommodate varying separation between the roller and the disk guide. The two beams are closely spaced and non-coplanar, and may be part of a double-beam mount. The double-beam mount attaches the two beams to the housing and to a frame, which positions the roller near the disk guide and the disk entry/exit aperture. Sliding the disk along the plate or other disk guide, the roller is reversible to drive the disk in or out through the disk entry/exit aperture.

20 Claims, 5 Drawing Sheets

Fig. 9

OPTICAL DISK MECHANISM WITH SHAPED ROLLER AND DOUBLE BEAM MOUNT

CROSS-REFERENCE TO RELATED APPLICATION

This application claims priority from U.S. provisional application No. 61/142,833, filed Jan. 6, 2009.

TECHNICAL FIELD

The present invention relates to an optical disk mechanism such as a disk drive or disk transport.

BACKGROUND ART

Disk changers and other optical disk systems allow a disk to be selected and moved into or out of a read unit or read/write unit for access to the contents of the disk. Multiple disks may be in one or more magazines or cartridges, or available as bare disks on a tray, in a carousel or other arrangement.

Typically, a read unit or read/write unit may allow a single disk to pass through a single disk entry/exit slot or aperture. Likewise, a magazine or cartridge typically has a single disk entry/exit slot or aperture through which a disk may be put into or taken out of the magazine or cartridge.

When moving an optical disk from one location to a read or read/write unit, an optical disk transport mechanism may be used. A flat, carousel-based disk changer usually rotates the carousel to bring a disk to a read/write head. A toroidal array, carousel-based disk changer usually rotates the carousel to bring a disk to a read/write unit, and an additional mechanism moves the disk into the unit. These carousel-based disk changers move the entire optical disk array as part of an optical disk transport mechanism.

Other systems may use an optical disk transport mechanism to select a disk and bring the disk to or from a read unit or read/write unit without moving the entire optical disk array.

A read unit or a read/write unit often employs a roller to roll a disk into or out of the read or read/write unit. The roller is driven by a motor, through gears and/or a belt, and the roller is often cylindrical and made of a synthetic rubber or other high-friction, low-scratch-quotient material.

A disk guide guides the disk while the roller drives or rolls the disk. In order for the roller to make a friction contact with the disk, the roller is sometimes made of a soft, spongy material, or various arrangements of pivots or springs may be employed to press the roller and disk guide together, with the disk between the roller and the disk guide.

SUMMARY

A preferred embodiment of an optical disk mechanism has a housing with a disk entry/exit aperture and a disk guide. Within and attached to the housing, the disk guide is aligned with the disk entry/exit aperture and is directed to guide an optical disk in or out through the disk entry/exit aperture. The housing has two beams that support a roller with a drive mechanism. Flexible, positioned and directed to bias the roller towards the optical disk, the two beams maintain the rotational axis of the roller parallel to the optical disk. The two beams also accommodate varying positioning of the roller relative to the disk guide, when the optical disk is being guided by the disk guide. The beams are closely spaced and non-coplanar.

The disk guide may be a plate with opposing first and second faces for guiding the optical disk, and the faces may be concave. One or both faces of the plate may have grooves for guiding the optical disk. The roller is near the disk guide and the disk entry/exit aperture. Both the disk guide and the roller may be dimensioned to contact the optical disk only at or near the circumference of the optical disk. The roller may be radially symmetric, having a concavely curved cross-section, having two truncated cones tapering towards a central cylinder, or having two truncated cones tapering towards a common intersection, or the roller may have a saddle-shaped cutout region.

The two beams are attached to the housing and to a frame, and the frame rotatably mounts the roller. A motor drives the roller reversibly and is part of the drive mechanism, which is attached to the frame. The two beams may be part of a double-beam mount. The two beams may further support a second roller near a second disk entry/exit aperture of the housing, or a second set of two beams may support a second roller near the first disk entry/exit aperture.

In a preferred embodiment, one set of two beams supports two rollers and a second set of two beams supports two further rollers, in a housing with two disk entry/exit apertures and a plate with two faces as a disk guide. A further set of two beams may support the two rollers and a still further set of two beams may support the two further rollers. A second motor may be included in the drive mechanism. The rollers drive an optical disk in and out through either of the two disk entry/exit apertures and along either face of the plate.

BRIEF DESCRIPTION OF THE DRAWINGS

FIGS. 5 A, B and C are top views of a roller and an optical disk, for three different shapes of rollers.

FIGS. 6 A, B and C are side views of a disk between two rollers, for three different shapes of rollers.

DETAILED DESCRIPTION

An optical disk mechanism, for use in a disk changer, disk read unit, disk read/write unit, optical disk drive, optical disk transport or other system is herein described.

Figure 1:
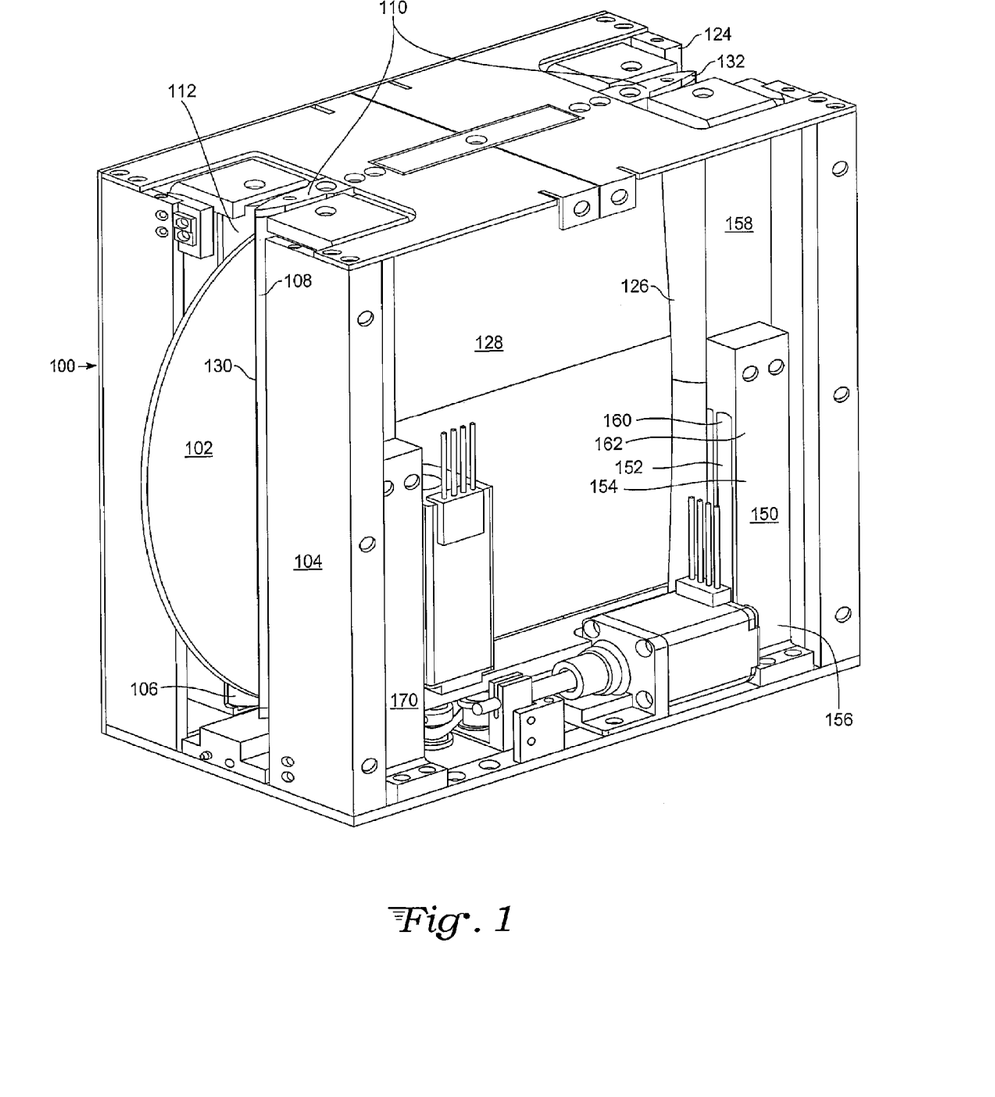
FIG. 1 is a perspective view of one preferred embodiment of an optical disk mechanism, showing a housing, rollers, a frame and double-beam mounts.

In FIG. 1, one preferred embodiment of the optical disk mechanism 100 is shown. An optical disk 102 is driven into or out of the housing 104 through a disk entry/exit aperture 106. A plate 108, acting as a disk guide 110, guides the optical disk as the roller 112 drives the disk.

Figure 2:
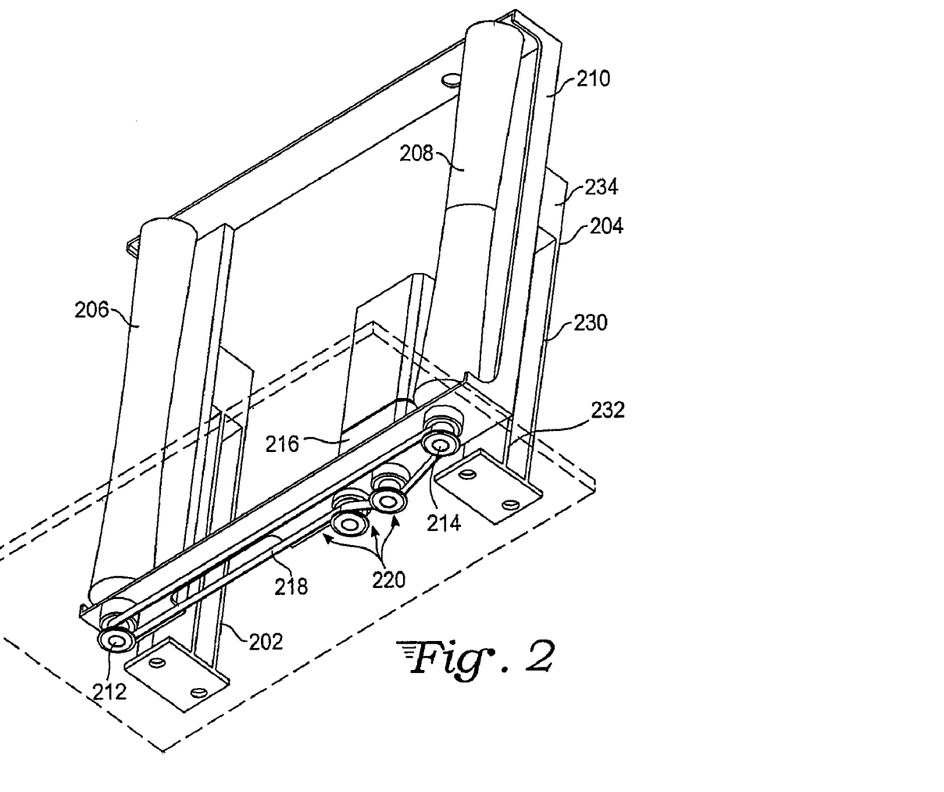
FIG. 2 is a perspective view of the rollers, frame and double-beam mounts of FIG. 1, along with a drive mechanism. Dashed lines depict part of the housing.

FIG. 2 shows double-beam mounts 202 and 204 supporting rollers 206 and 208. Mounted in a frame 210, the rollers 206 and 208 rotate about their respective rotation axes 212 and 214, and are reversibly driven by a motor 216 and a belt 218 as part of a drive mechanism 220. As part of double-beam mount 204, two beams 230 and 232 rotatably support the roller 208 with a drive mechanism 220 via the block 234 of the double-beam mount. These two beams 230 and 232 are also supporting the roller 206 in cooperation with the two beams of double-beam mount 202.

Figure 3:
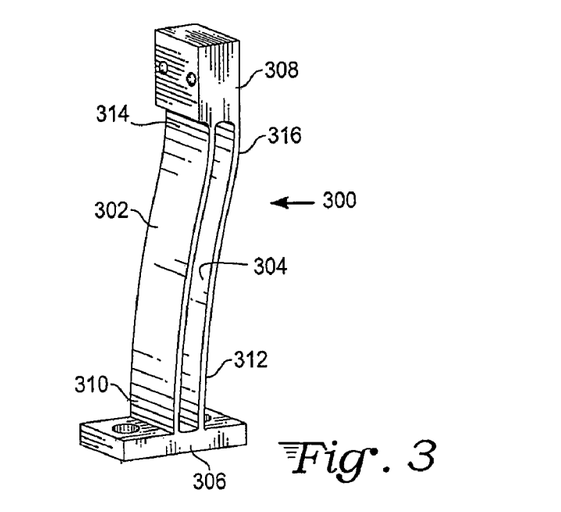
FIG. 3 is a perspective view of the double-beam mount of FIG. 2 as the beams flex.

FIG. 3 shows a double-beam mount 300 as the mount flexes, or, equivalently, as the two beams 302 and 304 of the double-beam mount 300 flex. Referring back to FIG. 2, the two beams 232 and 230 of double-beam mount 204 support one or more rollers by flexing in unison to maintain a rotational axis of the roller parallel to the optical disk, the plate or other disk guide. This flexing of the two beams biases the roller towards the optical disk and also accommodates varying positioning of the roller relative to the optical disk, plate or other disk guide. Two beams supporting two rollers while flexing in this manner can maintain the rotational axes of both rollers parallel to the optical disk, plate or other disk guide and maintain a similar separation between the rollers and the optical disk, plate or other disk guide. Note that beams that are aligned in a coplanar manner will be less effective in maintaining a parallel relationship between parts to which they are attached, as will a solitary beam. Coplanar beams or a solitary beam will allow twisting, tilting and other non-parallel relationships to develop during beam flexure.

The double-beam mount 300, of FIG. 3, has two beams 302 and 304 extending from a base 306 to a block 308, with the housing end 310 and 312 of each beam joining the base 306 and with the frame end 314 and 316 of each beam joining the block 308. The two beams 302 and 304 are closely spaced and non-coplanar, and thus flex in unison when the block 308 is displaced with respect to the base 306, maintaining a parallel relationship between the base and the block or any parts attached thereto. A structure with two such beams is very stiff in all directions except one, allowing slight motion with applied force in that one direction. In a preferred embodiment, the double-beam mount is a unitary body.

A material that is fairly stiff, but has some give, may be used for the beams. The material should have elasticity for flexure, but not fatigue easily. Steel, aluminum, another metal, an alloy or plastic may be suitable.

Figure 4:
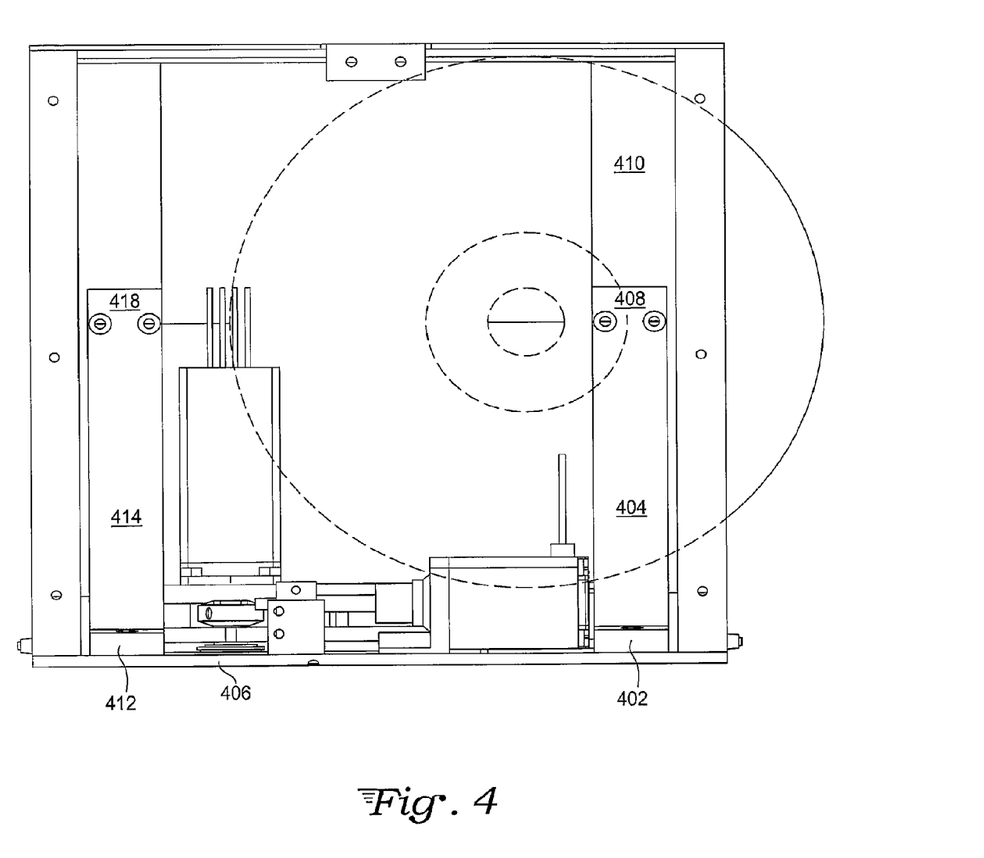
FIG. 4 is an end view of the frame, double-beam mounts and part of the housing of FIG. 1. An optical disk is shown in dashed lines.

In FIG. 4, the base 402 of a double-beam mount 404 attaches or is affixed to the housing 406, and the block 408 of the double-beam mount 404 attaches to the frame 410. In this manner, and with reference to FIG. 1, the double-beam mount 150 attaches the two beams 152 and 154 to the housing 104 at the housing end 156 of each beam and attaches the frame 158 to the two beams 152 and 154 at the frame end 160 and 162 of each beam.

Returning to FIG. 4, a second double-beam mount 414 attaches to the housing 406 at the base 412 and attaches to the frame 410 at the block 418. Similarly, in FIG. 1, a second double-beam mount 170 is attached to the housing 104 and the frame 158. Where the first double-beam mount may be considered to have a first beam and a second beam, and the second double-beam mount may be considered to have a third beam and a fourth beam, the third and fourth beams are flexible and cooperate with the first and second beams. Alternatively, the first beam and second beam may be viewed as a set of two beams, with the third and fourth beams a second set of two beams.

Figures 5A, 5B, 5C:
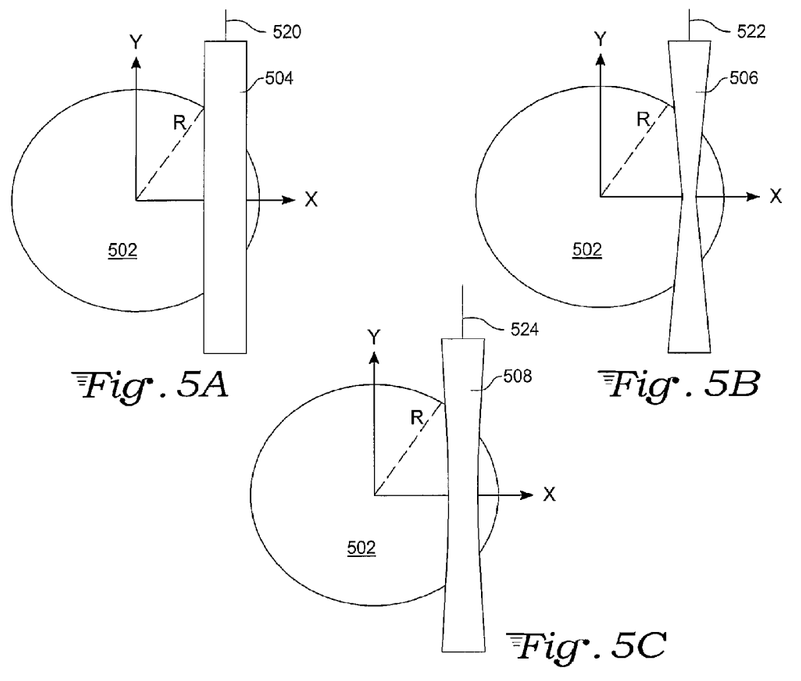
Figure 6A:
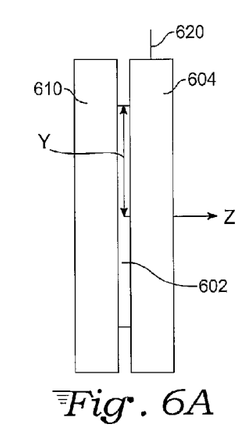
Figure 6B:
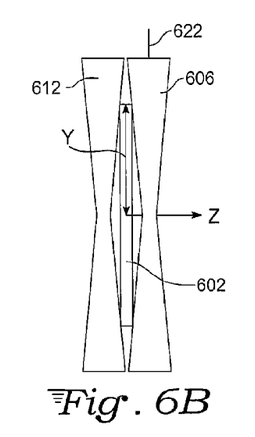
Figure 6C:
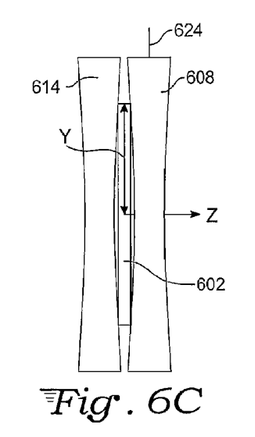

Various shapes of rollers are shown in FIGS. 5 A, B, and C and in FIGS. 6 A, B, and C, each of which depicts a roller interacting with an optical disk to drive a disk into the optical disk mechanism or drive the disk out of the optical disk mechanism. FIGS. 5 A, B, and C do not show a disk guide, although the disk could be sliding along a plate or the disk could be guided by another disk guide. A second roller acts as a disk guide 610, 612 and 614 in FIGS. 6 A, B, and C respectively, although a plate, grooves or another disk guide could be used.

A conventional, cylindrical roller 504 and 604, in FIGS. 5 A and 6 A, contacts the full surface of the optical disk 502 or 602 when the disk 602 is between the roller 604 and the disk guide 610. When the rotational axis 520 or 620 of the cylindrical roller 504 is maintained parallel to the disk 502 or the disk guide 610, the separation between the rotational axis 520 and the disk 502 or between the rotational axis 620 and the disk guide 610 does not vary as the disk is moved into or out of the optical disk mechanism.

In a preferred embodiment, the roller is dimensioned to contact an optical disk only at and proximate to the circumference of the optical disk, rather than contacting the full surface of the optical disk. By thusly contacting the disk only at the periphery, scratching and other damage of the disk in the region containing the data bits is minimized. A radially symmetric roller having two truncated cones tapering from outside ends of the roller towards an intersection of the two cones, as shown in FIGS. 5 B and 6 B as roller 506 and 606 respectively, has this type of dimensioning, as does a radially symmetric roller with a concavely curved contact surface, as shown in FIGS. 5 C and 6 C as roller 508 and 608 respectively. A further preferred embodiment of a roller having this type of dimensioning is a radially symmetric roller having two truncated cones tapering from outside ends of the roller towards a central cylinder.

As a roller with this type of dimensioning moves the disk into or out of the optical disk mechanism, the separation between the rotational axis 622 or 624 of the roller 606 or 608 and the optical disk 602 or the disk guide 612 or 614 may vary. This is particularly so of rollers whose diameter varies, unlike that of a uniform cylinder. Generally, a minimal separation between the rotational axis of the roller and the disk or the disk guide accompanies a position where the disk and the roller make initial contact. A maximal separation between the rotational axis of the roller and the disk or the disk guide accompanies a position where the disk and the roller make contact at the maximum span of the disk, that is when approximately half of the disk is to either side of the roller. This varying separation is accommodated by the two beams.

A further preferred embodiment of a roller is a roller with a saddle-shaped cutout region, such that the material remaining on the roller aligns with the circumference of the optical disk and contacts the optical disk only at and near that circumference. The beginning of the cutout region lines up with the edge of the disk, so as the roller turns, the region follows the contour of the disk edge. The diameter of the roller is calculated to allow at most one full revolution of the roller as the disk is moved by one full diameter of the disk. An optical sensor may detect the disk being loaded into the system and a flag on the roller or the roller shaft may be used to make sure the roller starts from the correct position every time a disk is loaded.

Figure 7:
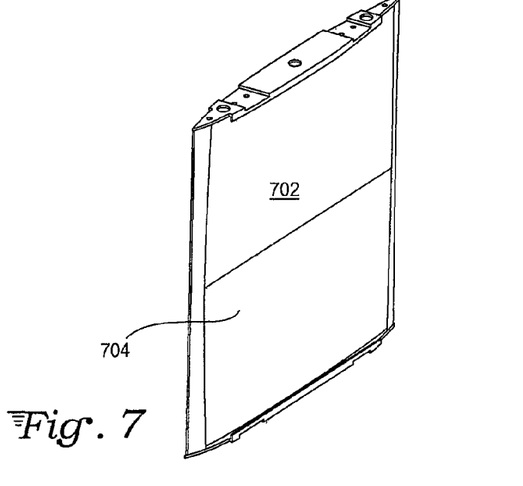
FIG. 7 is a perspective view of a plate, used as a disk guide.
Figure 8:
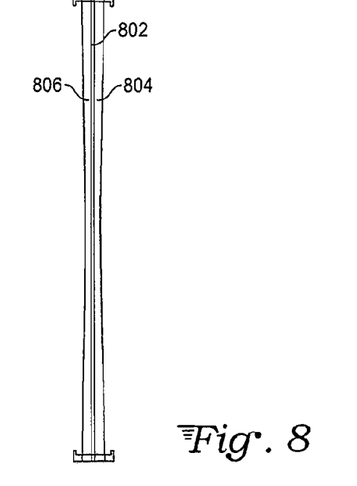
FIG. 8 is an end view of the plate of FIG. 7
Figure 9:
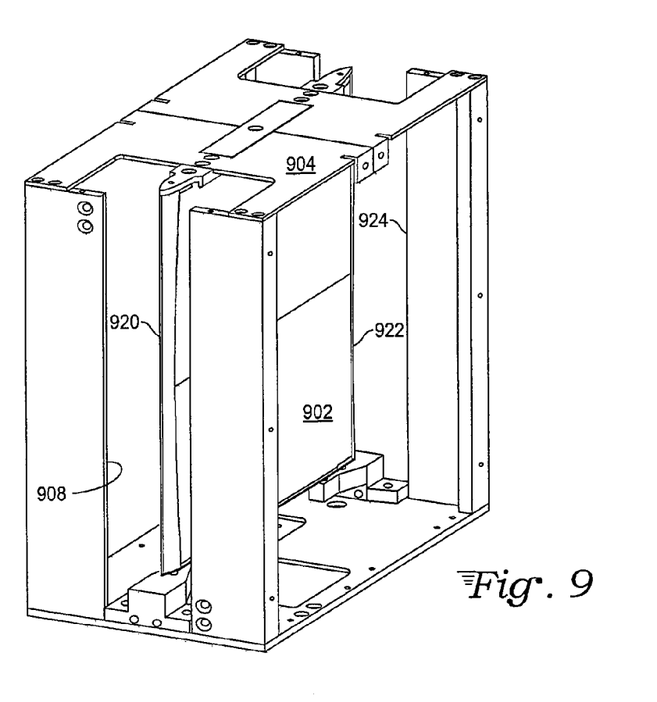
FIG. 9 is a perspective view of the plate of FIG. 7 attached within the housing.

In a preferred embodiment, as shown in FIGS. 7, 8 and 9, the disk guide is a plate, although another roller, grooves or another type of disk guide could be used as a disk guide. A disk guide aligned with a particular disk entry/exit aperture of a housing is directed to guide an optical disk in or out through that disk entry/exit aperture.

FIG. 7 shows the disk guide as a plate 702. The first face 704 of the plate 702 is concave and has an inverse geometric relationship with a roller when both the plate and the roller are dimensioned to contact an optical disk only at and proximate to the circumference of the optical disk, as in a preferred embodiment, this contact occurring when the optical disk is between the roller and the first face 704 of the plate 702.

FIG. 8 shows the cross-section of the plate 802, with a first face 804 being concave and an opposing second face 806. In this embodiment, the second face 806 of the plate 802 is also concave.

FIG. 9 shows the plate 902 mounted in the housing 904. A first edge 920 of the plate 902 is near and aligned with a first entry/exit aperture 908 of the housing 904. A second edge 922 of the plate 902 is near and aligned with a second entry/exit aperture 924 of the housing 904.

In a further preferred embodiment, the plate has grooves that guide an optical disk along either the first face or the second face. The grooves provide stability for an optical disk on either side of the plate.

The housing 904 of FIG. 9 and the optical disk mechanism 100 of FIG. 1, including housing 104, can handle one disk on either side of the disk guide or two disks, one on each side of the disk guide. Each disk may enter or exit through either of two entry/exit apertures.

Referring again to FIG. 1, one preferred embodiment of an optical disk mechanism 100 has a housing 104 with a first entry/exit aperture 106 and a second entry/exit aperture 124. A disk guide 110 is aligned with the first and second entry/exit apertures. In this embodiment, the disk guide 110 is a plate with a first face 128 and an opposing second face. The first edge 130 of the plate is aligned with the first entry/exit aperture 106, and the second edge 132 of the plate is aligned with the second entry/exit aperture 124. Two rollers, one of which is visible as roller 126, are rotatably mounted to a frame 158 and supported by two beams 152 and 154. The two beams 152 and 154 are part of a double-beam mount 150. The double-beam mount 150, and, in this embodiment a second set of two beams, in a second double-beam mount 170, maintains a rotational axis of each roller parallel to the optical disk and to the disk guide and allows varying separation between the roller and disk guide or between the roller and the disk when the disk is being guided by the disk guide.

Two additional rollers, one of which is visible as roller 112, are rotatably mounted to a second frame and supported by two additional beams as part of another double-beam mount and in this embodiment a further set of two beams in a double-beam mount. Each set of two beams as part of a respective double-beam mount flexes to maintain the rotational axis of each of the two rollers parallel to the plate or disk guide. All of the rollers are driven by a drive mechanism. In a preferred embodiment, a first motor and a second motor enable reversible rotations of the first, second, third and fourth rollers.

Thus, the embodiment shown in FIG. 1 has four rollers, a plate with two concave faces as a disk guide and two frames, each frame mounting two rollers. Eight beams as four sets of two beams, each set of two beams in a double-beam mount, support the frames and thereby the rollers. Each roller is near a disk entry/exit aperture and a disk guide. Each roller can drive an optical disk along a face of the plate and in through a disk entry/exit aperture as the disk slides along the face of the plate or other disk guide. Each roller can drive an optical disk along a face of the plate and out through a disk entry/exit aperture, as the disk slides along the face of the plate or other disk guide.

An optical disk 102 may enter the optical disk mechanism through either of the two entry/exit apertures 106 and 124 and on either side of the disk guide 110. Two disks may be handled at the same time, with either disk entering, exiting or being within the housing while the other disk is handled independently.

Various embodiments may be devised by a person skilled in the art without departing from the scope as claimed. The drive mechanism may have one motor driving only one roller, driving two rollers, driving all four rollers, two motors with each motor driving a pair of rollers and so on. A motor may be reversible or the roller may be reversible via some other aspect of the drive mechanism. The rollers may be mounted to a frame or be supported directly by beams in a frameless design. Beams may be added. Beams may be staggered, offset or in formation. Beams may be discrete parts or parts of beam mounts including double-beam mounts. Double-beam mounts may have differing numbers of apertures for fasteners or other means of attaching or affixing a mount to a housing or a frame or other structures for supporting rollers. Single, double and quadruple roller designs may use beams, sets of beams, beam-mounts, double-beam mounts and so on in various combinations. The housing may nearly completely enclose the remainder of the mechanism or be minimal. The rollers may have the shapes listed and/or the dimensioning described or may be otherwise shaped. Numbering of the rollers or other parts is arbitrary and of no particular consequence.

What is claimed is:

1. An optical disk mechanism comprising:
    a housing having a disk entry/exit aperture and a disk guide within and attached to the housing, the disk guide being aligned with the disk entry/exit aperture and directed to guide an optical disk in or out through the disk entry/exit aperture, the housing further including two beams being attached to the housing at a housing end of each beam, the two beams rotatably supporting a roller with a drive mechanism, the two beams being flexible and positioned and directed to bias the roller towards the optical disk, to maintain a rotational axis of the roller parallel to the optical disk and to accommodate varying positioning of the roller relative to the disk guide, when the optical disk is being guided by the disk guide.

2. The optical disk mechanism of claim 1 wherein the disk guide is a plate having a first face, the first face guiding the optical disk.

3. The optical disk mechanism of claim 2 wherein:
    the plate has a second face opposing the first face;
    the roller is a first roller and the two beams are a first set of two beams; and
    the housing further includes a second set of two beams attached to the housing at a housing end of each beam, the second set of two beams rotatably supporting a second roller driven by the drive mechanism, the second set of two beams being flexible and positioned and directed to bias the second roller towards the optical disk, to maintain a rotational axis of the second roller parallel to the optical disk and to accommodate varying positioning of the second roller, when the optical disk is being guided by the second face of the plate.

4. The optical disk mechanism of claim 3 wherein:
    the first set of two beams further rotatably supports a third roller driven by the drive mechanism; and
    the second set of two beams further rotatably supports a fourth roller driven by the drive mechanism.

5. The optical disk mechanism of claim 1 wherein the roller is proximate to the disk entry/exit aperture and to the disk guide, the roller and the disk guide being dimensioned to contact an optical disk only at and proximate to the circumference of the optical disk.

6. The optical disk mechanism of claim 1 wherein:
    the roller is one of a radially symmetric roller with a concavely curved contact surface, a radially symmetric roller having two truncated cones tapering towards a central cylinder, a radially symmetric roller having two truncated cones tapering towards a common intersection and a roller with a saddle-shaped cutout region.

7. The optical disk mechanism of claim 1 wherein:
the two beams rotatably supporting a roller with a drive mechanism are attached to a frame which rotatably mounts the roller, the drive mechanism being attached to the frame and having a motor driving the roller.

8. The optical disk mechanism of claim 1 further comprising:
a double-beam mount being a unitary body and having the two beams extending from a base to a block, the base being affixed to the housing and thereby attaching the housing end of each beam to the housing, the two beams rotatably supporting the roller with the drive mechanism via the block of the double-beam mount.

9. The optical disk mechanism of claim 1 wherein:
the disk entry/exit aperture is a first disk entry/exit aperture, the housing further including an opposing second disk entry/exit aperture; and
the roller is a first roller, the two beams further rotatably supporting a second roller, the two beams biasing the first and second rollers towards the optical disk, the first and second rollers being driven by the drive mechanism.

10. An optical disk mechanism comprising:
a housing having a disk entry/exit aperture and a plate within and attached to the housing, the plate having a first edge aligned with the disk entry/exit aperture and having a first face, the housing further including a frame attached to two beams at a frame end of each beam, the two beams being attached to the housing at a housing end of each beam, the frame rotatably supporting a roller with a drive mechanism, the two beams being flexible and positioned and configured to bias the frame and the roller towards the first face of the plate, to maintain a rotational axis of the roller parallel to the plate and to accommodate varying separation between the roller and the first face of the plate.

11. The optical disk mechanism of claim 10 wherein the roller is proximate to the disk entry/exit aperture and to the first face of the plate, the roller and the first face of the plate having an inverse geometric relationship and being dimensioned to contact an optical disk only at and proximate to the circumference of the optical disk when the optical disk is between the roller and the first face of the plate.

12. The optical disk mechanism of claim 10 wherein:
the roller is one of a radially symmetric, concavely curved roller, a radially symmetric roller having two truncated cones tapering from circular ends towards a central cylinder, a radially symmetric roller having two truncated cones tapering from circular ends towards an intersection and a roller with a saddle-shaped cutout region.

13. The optical disk mechanism of claim 10 wherein:
the two beams are in combination as a unitary body to define a double-beam mount having a base at the housing ends of the two beams and a block at the frame ends of the two beams, the unitary body being attached to the housing at the base and to the frame at the block, thereby attaching the two beams to the housing at the housing end of each beam and attaching the frame to the two beams at the frame end of each beam.

14. The optical disk mechanism of claim 10 wherein:
the two beams are a first beam and a second beam, the frame further having a third beam and a fourth beam attached to the frame at a frame end of each beam and attached to the housing at an opposing housing end of each beam, the third beam and the fourth beam being flexible and cooperating with the first and second beams.

15. The optical disk mechanism of claim 10 wherein:
the disk entry/exit aperture is a first disk entry/exit aperture, the housing further having an opposing second disk entry/exit aperture;
the plate has a second face opposing the first face; the frame is a first frame, the two beams are a first set of two beams and the roller is a first roller;
the first frame further rotatably supports a second roller driven by the drive mechanism; and
the housing further includes a second frame attached to a second set of two beams at a frame end of each beam, the second set of two beams being attached to the housing at a housing end of each beam, the second frame rotatably supporting third and fourth rollers driven by the drive mechanism, the second set of two beams being flexible and positioned and configured to bias the second frame and the third and fourth rollers towards the second face of the plate, to maintain a rotational axis of the third roller and a rotational axis of the fourth roller parallel to the plate and to accommodate varying separation between the third roller and the second face of the plate.

16. An optical disk mechanism comprising:
a housing with a disk entry/exit aperture;
a double-beam mount attached at a base to the housing, the double-beam mount having two beams extending from the base to a block, the two beams being closely spaced and non-coplanar;
a frame attached to the block;
a roller, supported by the frame, the roller being driven by a motor and rotating on a rotational axis; and
a plate attached to the housing and having a first edge proximate to and parallel to the disk entry/exit aperture, the plate having a first face;
the frame and the double-beam mount positioning the roller proximate to the first face and the first edge of the plate so that the roller drives an optical disk slidably along the first face of the plate and in through the disk entry/exit aperture and the roller drives the optical disk slidably along the first face of the plate and out through the disk entry/exit aperture, the two beams of the double-beam mount flexing to maintain the rotational axis of the roller parallel to the plate.

17. The optical disk mechanism of claim 16 wherein:
the plate has a concave face; and
the roller is one of a radially symmetric, concavely curved roller, a radially symmetric roller having two truncated cones tapering from outside ends of the roller towards a central cylinder, a radially symmetric roller having two truncated cones tapering from outside ends of the roller towards an intersection and a roller with a saddle-shaped cutout region;
the plate and the roller contacting the optical disk only at the periphery of the optical disk.

18. The optical disk mechanism of claim 16 wherein:
the double-beam mount is a first double-beam mount with a first base, a first block and a first and a second beam, the frame further having a second double-beam mount with a second base, a second block and a third and a fourth beam between the second base and the second block, the second double-beam mount being attached at the second base to the housing and attached at the second block to the frame, the third and fourth beams being flexible, and the second double-beam mount being configured to cooperate with the first double-beam mount.

19. The optical disk mechanism of claim 16 wherein:

the disk entry/exit aperture is a first disk entry/aperture, the housing further having an opposing second disk entry/exit aperture;

the plate has a second edge proximate to and parallel to the second disk entry/exit aperture, the second edge of the plate opposing the first edge of the plate;

the roller is a first roller and the rotational axis of the first roller is a first rotational axis, a second roller being rotatably supported by the frame and being driven by the motor and rotating on a second rotational axis; and the frame and the double-beam mount positions the second roller proximate to the first face and the second edge of the plate so that the second roller drives an optical disk slidably along the first face of the plate and in through the second disk entry/exit aperture and the second roller drives the optical disk slidably along the first face of the plate and out through the second disk entry/exit aperture, the two beams of the double-beam mount flexing to maintain the second rotational axis of the second roller parallel to the plate.

20. The optical disk mechanism of claim 19 wherein:

the frame is a first frame, the double-beam mount is a first double-beam mount, the motor is a first motor and the plate has a second face opposing the first face;

a second double-beam mount is attached at a base to the housing, the second double-beam mount having two beams between the base and a block, the two beams flexing in unison when the block is displaced laterally with respect to the base;

a second frame is attached to the block of the second double-beam mount;

a third roller and a fourth roller are supported by the second frame, the third and fourth rollers being driven by a second motor and rotating on a third rotational axis and a fourth rotational axis, respectively;

the first and second motors enable reversible rotations of the first, second, third and fourth rollers; and the second frame and the second double-beam mount position the third and fourth rollers proximate to the second face and the first and second edges of the plate respectively, so that the third roller drives an optical disk slidably along the second face of the plate and in through the first disk entry/exit aperture and the third roller drives the optical disk slidably along the second face of the plate and out through the first disk entry/exit aperture, the fourth roller drives an optical disk slidably along the second face of the plate and in through the second disk entry/exit aperture and the fourth roller drives the optical disk slidably along the second face of the plate and out through the second disk entry/exit aperture, the two beams of the double-beam mount flexing to maintain the third rotational axis of the third roller and the fourth rotational axis of the fourth roller parallel to the plate.

* * * * *